United States Patent
Yonge, III et al.

(10) Patent No.: US 7,729,372 B2
(45) Date of Patent: Jun. 1, 2010

(54) COMMUNICATING IN A NETWORK THAT INCLUDES A MEDIUM HAVING VARYING TRANSMISSION CHARACTERISTICS

(75) Inventors: Lawrence W. Yonge, III, Ocala, FL (US); Srinivas Katar, Ocala, FL (US); James E. Petranovich, La Jolla, CA (US); Neal Riedel, Carlsbad, CA (US); George M. Peponides, Encinitas, CA (US); Wai Chung Chan, Vancouver, WA (US)

(73) Assignees: Sharp Corporation, Tenri Nara (JP); CopperGate Communications Ltd., Tel Aviv (IL); Atheros Communications, Inc., Santa Clara, CA (US)

( * ) Notice: Subject to any disclaimer, the term of this patent is extended or adjusted under 35 U.S.C. 154(b) by 854 days.

(21) Appl. No.: 11/337,946

(22) Filed: Jan. 23, 2006

(65) Prior Publication Data

US 2007/0025391 A1 Feb. 1, 2007

Related U.S. Application Data

(60) Provisional application No. 60/702,717, filed on Jul. 27, 2005, provisional application No. 60/705,720, filed on Aug. 2, 2005.

(51) Int. Cl.
*H04B 7/212* (2006.01)
*H04J 3/06* (2006.01)
*G05B 11/01* (2006.01)
*H04M 9/00* (2006.01)

(52) U.S. Cl. .................. 370/442; 370/508; 370/509; 340/310.11; 455/402

(58) Field of Classification Search ......... 370/310–350, 370/442, 445–448, 503–520; 455/402; 340/310.11, 340/538
See application file for complete search history.

(56) References Cited

U.S. PATENT DOCUMENTS 6,074,086 A 6/2000 Yonge, III (Continued)

FOREIGN PATENT DOCUMENTS

EP 1748574 A1 * 1/2007

(Continued)

OTHER PUBLICATIONS

Lee et al., "HomePlug 1.0 Powerline Communication LANs—Protocol Description and Performance Results version 5.4", 2000, International Journal of Communication Systems, 2000 00:1-6, pp. 1-25.*

(Continued)

*Primary Examiner*—Tri H Phan
(74) *Attorney, Agent, or Firm*—Fish & Richardson P.C.

(57) ABSTRACT

A method and corresponding system for operating in a network in which stations communicate over a shared medium are presented. The shared medium has at least one varying channel characteristic that varies approximately periodically. The method includes providing repeated beacon transmissions from a coordinator station for coordinating transmissions among a plurality of the stations, wherein at least some beacon transmissions are synchronized to the varying channel characteristic; and transmitting from a first station to at least one receiving station during a time slot determined based on at least one of the beacon transmissions received by the first station from the coordinator station.

62 Claims, 6 Drawing Sheets

U.S. PATENT DOCUMENTS

| | | | |
|---|---|---|---|
| 6,111,919 | A | 8/2000 | Yonge, III |
| 6,269,132 | B1 | 7/2001 | Yonge, III |
| 6,278,685 | B1 | 8/2001 | Yonge, III |
| 7,085,284 | B1 | 8/2006 | Negus |
| 7,369,579 | B2 * | 5/2008 | Logvinov et al. ........... 370/509 |
| 7,506,042 | B2 | 3/2009 | Ayyagari |
| 7,558,294 | B2 * | 7/2009 | Yonge et al. ................ 370/509 |
| 2002/0137462 | A1 | 9/2002 | Rankin |
| 2003/0012166 | A1 | 1/2003 | Benveniste |
| 2003/0048183 | A1 | 3/2003 | Vollmer et al. |
| 2003/0086437 | A1 | 5/2003 | Benveniste |
| 2003/0137993 | A1 | 7/2003 | Odman |
| 2004/0047319 | A1 | 3/2004 | Elg |
| 2004/0070912 | A1 * | 4/2004 | Kopp ......................... 361/119 |
| 2004/0081089 | A1 | 4/2004 | Ayyagari et al. |
| 2004/0165532 | A1 | 8/2004 | Poor et al. |
| 2004/0218577 | A1 | 11/2004 | Nguyen et al. |
| 2005/0001694 | A1 | 1/2005 | Berkman |
| 2005/0025176 | A1 | 2/2005 | Ko et al. |
| 2005/0147075 | A1 | 7/2005 | Terry |
| 2005/0190785 | A1 * | 9/2005 | Yonge et al. ................ 370/465 |
| 2006/0077997 | A1 * | 4/2006 | Yamaguchi et al. ......... 370/445 |
| 2007/0025391 | A1 | 2/2007 | Yonge, III et al. |
| 2007/0026794 | A1 * | 2/2007 | Ayyagari et al. ........... 455/11.1 |
| 2007/0058661 | A1 | 3/2007 | Chow |
| 2007/0060141 | A1 | 3/2007 | Kangude et al. |
| 2007/0147322 | A1 | 6/2007 | Agrawal et al. |
| 2009/0011782 | A1 * | 1/2009 | Yonge et al. ................ 455/502 |
| 2009/0034552 | A1 * | 2/2009 | Yonge et al. ................ 370/458 |
| 2009/0067389 | A1 | 3/2009 | Lee et al. |
| 2009/0154487 | A1 * | 6/2009 | Ryan et al. .................. 370/445 |
| 2009/0207865 | A1 * | 8/2009 | Yonge et al. ................ 370/503 |

FOREIGN PATENT DOCUMENTS

| | | |
|---|---|---|
| EP | 1748597 | 1/2007 |
| WO | WO 96/34329 A1 * | 10/1996 |
| WO | WO 02/103943 A1 * | 12/2002 |
| WO | WO 03/100996 A1 | 12/2003 |
| WO | WO 03/100996 A2 * | 12/2003 |
| WO | WO2004/038980 | 5/2004 |

OTHER PUBLICATIONS

Afkhamie et al., "An Overview of the upcoming HomePlug AV Standard", May 2005, IEEE 0-7803-8844-5/05, pp. 400-404.*

Katar et al., "Beacon Schedule Persistence to Mitigate Beacon Loss in HomePlug AV Networks", May 2006, IEEE 1-4244-0113-5/06, pp. 184-188.*

HomePlug Powerline Alliance Inc., "HomePlug AV White Paper", Doc ver. No. HPAVWP-050818, Aug. 2005, pp. 1-11.*

European Search Report, European Patent Office, European Patent Application No. 06253916.8—1246, Oct. 31, 2006, 8 Pages.

International Search Report & Written Opinion in PCT application No. PCT/US2008/065831, dated Feb. 20, 2009, 22 pages.

* cited by examiner

COMMUNICATING IN A NETWORK THAT INCLUDES A MEDIUM HAVING VARYING TRANSMISSION CHARACTERISTICS

CROSS-REFERENCE TO RELATED APPLICATIONS

This application claims the benefit of U.S. Application Ser. No. 60/702,717, filed on Jul. 27, 2005, and U.S. Application Ser. No. 60/705,720, filed on Aug. 2, 2005, each of which is incorporated herein by reference.

TECHNICAL FIELD

The invention relates to network protocols, and more particularly to communicating in a network that includes a medium having varying transmission characteristics.

BACKGROUND

Communication systems are designed to reliably transfer information using the underlying physical medium. Well-known communication systems like Ethernet use special wiring (e.g., Cat 5 cable) for exchanging information. Such systems, by design, allow all connected stations to exchange data at a fixed data rate. With the increasing need for ubiquitous exchange of information, a new class of no-new-wire systems has emerged. Such systems use existing infrastructure to exchange information. Power line communication systems are one example of such systems.

Power line communication systems use existing AC wiring to exchange information. Owing to their being designed for much lower frequency transmissions, AC wiring provides varying channel characteristics at the higher frequencies used for data transmission (e.g., depending on the wiring used and the actual layout). To maximize the data rate between various links, stations need to adjust their transmission parameters dynamically. This process is called channel adaptation. Channel adaptation results in adaptation information specifying a set of transmission parameters that can be used on each link. Adaptation information includes such parameters as the frequencies used, their modulation, and the forward error correction (FEC) used. In high-speed power line communication systems, good channel adaptation is critical to providing high data rates on all links.

Higher data rates can be achieved in power line communication systems by taking into account the fact that the noise and/or the frequency response of the power line channel between any pair of stations depends on the AC line cycle phase. Power line communication systems share the power line medium with various appliances that draw electric power from the power supply grid. These devices are one of the major sources of noise that affect the characteristics of power line channels. Several types of such devices generate noise that varies with the AC line cycle phase. For example, in some cases the noise around the zero crossing on the AC line cycle is lower by comparison to the noise at the peaks of the AC cycle. Devices like triac-controlled dimmers turn on and off during each AC line cycle. These not only generate impulse noise, but also change the frequency response of the power line channel (e.g., by a load on the line that attenuates some frequencies more than others). Further, several devices that use AC motors (e.g., vacuum cleaners, drills, etc.) generate noise that is also a function of the phase of the line cycle. The net effect is a time varying channel whose noise characteristics and frequency response depend on the AC line cycle phase. Various techniques can be used to take into account the varying channel characteristics. For example, for communication between a pair of stations over an AC power line (or other medium having a periodically varying channel) a different channel adaptation can be assigned to each of multiple phase regions of the periodically varying channel.

SUMMARY

In one aspect, the invention features a method and corresponding system for operating in a network in which stations communicate over a shared medium. The shared medium has at least one varying channel characteristic that varies approximately periodically. The method includes providing repeated beacon transmissions from a coordinator station for coordinating transmissions among a plurality of the stations, wherein at least some beacon transmissions are synchronized to the varying channel characteristic; and transmitting from a first station to at least one receiving station during a time slot determined based on at least one of the beacon transmissions received by the first station from the coordinator station.

Implementations of this aspect of the invention may incorporate one or more of the following.

The coordinating station assigns time slots to at least some stations designated by information in the beacon transmissions.

At least some stations synchronize adaptation to transmission time slots designated by the coordinator station to enable the stations to assign different adaptation according to different phase regions of the periodically varying channel characteristic.

At least some transmissions over the shared medium include quality of service (QoS) sensitive transmissions, and the coordinator station assigns time slots for at least some of the QoS sensitive transmissions that correspond to phase regions of the periodically varying channel characteristic in which transmission impairments are less than in other phase regions.

The network includes a power line communication network and the shared medium includes an alternating current (AC) power line.

The varying channel characteristic includes noise that varies according to an AC power line waveform.

The varying channel characteristic includes a frequency response that varies according to an AC power line waveform.

The method further includes synchronizing at least some beacon transmissions to an alternating current power line waveform at the coordinator station.

Synchronizing at least some beacon transmissions to the alternating current power line waveform includes detecting a zero crossing of the alternating current power line waveform.

Synchronizing at least some beacon transmissions to the alternating current power line waveform includes setting a time between successive beacon transmissions to an integral multiple of half periods of the alternating current power line waveform.

The method further includes selecting the integral multiple to be large enough for the time duration of the beacon transmission to be less than half of the time between successive beacon transmissions.

The integral multiple is four, so that the time between successive beacon transmissions is two periods of the alternating current power line waveform.

The method further includes transmitting from the first station to a receiving station during a time slot determined from a time reference contained in the beacon transmission received by the first station.

The time reference includes a time at which a predetermined portion of the beacon transmission is received by the first station.

Determining the time slot from the time reference includes determining starting and ending times for the time slot measured from the time reference, based on information in the beacon transmission.

The time slot is assigned to the first station for transmitting to at least one receiving station.

The first station is assigned a plurality of non-contiguous time slots between successive beacon transmissions for transmitting to at least one receiving station.

The plurality of time slots are arranged such that the longest time between any two time slots assigned to the first station is small enough to satisfy a latency constraint of an application transmitting from the first station.

The plurality of time slots include opportunities to retransmit data to account for a data loss rate.

The time slot is available for the first station after a successful contention process.

The coordinating station assigns time slots to at least some stations designated by information in the beacon transmissions, and assigns a region of time over which any of a plurality of stations can transmit after a successful contention process.

Transmitting from the first station to the receiving station includes preparing a signal to be transmitted during the time slot based on adaptation information from the receiving station.

The adaptation information includes a map that designates a type of modulation that is to be used, respectively, on each of multiple carriers in the signal.

The adaptation information includes a plurality of maps, each map designating a type of modulation that is to be used, respectively, on each of multiple carriers in the signal, each map corresponding to a selected interval of time between beacon transmissions.

The time slot overlaps with a plurality of the selected time intervals.

The adaptation information includes a forward error correction rate that is to be used for encoding the signal.

The adaptation information includes a guard interval length that is to be used between symbols forming the signal.

The adaptation information is determined by the receiving station based on at least one prior transmission from the first station.

The adaptation information is determined by the receiving station based on at least one prior transmission from the first station during a previous time slot that corresponds to the time slot.

The adaptation information is determined by the receiving station based on characterizing effects of the shared medium on a prior transmission from the first station.

The prior transmission includes data known to the receiving station.

The effects include at least one of signal-to-noise ratio, attenuation, and bit error rate.

The method further includes transmitting information based on the effects to the coordinator station for use in assigning time slots to stations.

The information based on the effects includes a predicted maximum data rate that can be reliably achieved within a specified time slot.

The prior transmission occurs during a temporary time slot assigned by the coordinator station before the coordinator station assigns more persistent time slots to stations.

The coordinator station uses predicted maximum data rates from a plurality of stations to increase the total capacity of the network.

The adaptation information is determined based on communication characteristics of an application transmitting between the first station and the receiving station.

The communication characteristics include sensitivity of the application to data loss.

The communication characteristics include quality of service requirements of the application.

The adaptation information is determined by the receiving station in response to a request from the first station.

The method further includes transmitting updated adaptation information from the receiving station to the first station in response to a change in a metric characterizing effects of the shared medium on a prior transmission from the first station.

The method further includes transmitting the adaptation information to the coordinator station.

The adaptation information is transmitted to the coordinator station from the first station.

The adaptation information is transmitted to the coordinator station from the receiving station.

The adaptation information is transmitted to the coordinator station in a message for the coordinator station.

The adaptation information is transmitted to the coordinator station in a header of a message broadcast over the shared medium.

The coordinator station determines time slots assigned to stations based on the adaptation information.

The method further includes transmitting a signal from the first station to a plurality of receiving stations during the time slot, including preparing the signal based on adaptation information from at least some of the plurality of receiving station.

Preparing the signal based on the adaptation information includes preparing the signal using the lowest modulation bits per symbol received from any of the plurality of receiving stations.

Preparing the signal based on the adaptation information includes preparing the signal using the lowest forward error correction rate received from any of the plurality of receiving stations.

Transmitting from a first station to at least one receiving station during a time slot determined based on at least one of the beacon transmissions received by the first station from the coordinator station includes, after failing to successfully receive a recent beacon transmission, transmitting from the first station to a receiving station during a time slot determined based on information contained in a beacon transmission prior to the recent beacon transmission.

The method further includes determining a start time of a beacon transmission based on a time offset from a detected feature of the varying channel characteristic.

The method further includes selecting the time offset based on reliability of successful reception of beacon transmissions by stations in the network.

The beacon transmission includes information indicating a start time of a future beacon transmission.

The information is based on start times of a plurality of past beacon transmissions.

The beacon transmission includes information indicating start times of a plurality of future beacon transmissions.

The beacon transmission includes information indicating time slots relative to the future beacon transmissions during which the first station is permitted to transmit to at least one receiving station.

Among the many advantages of the invention (some of which may be achieved only in some of its various aspects and implementations) are the following.

It enables stations to operate reliability and at higher data rates under various power line environments. It provides a channel adaptation mechanism that can be used in power line communication systems as well as other media that are affected by periodically varying channel impairments. It can provide a higher level of guaranteed quality of service (QoS).

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

System Overview

Figure 2:
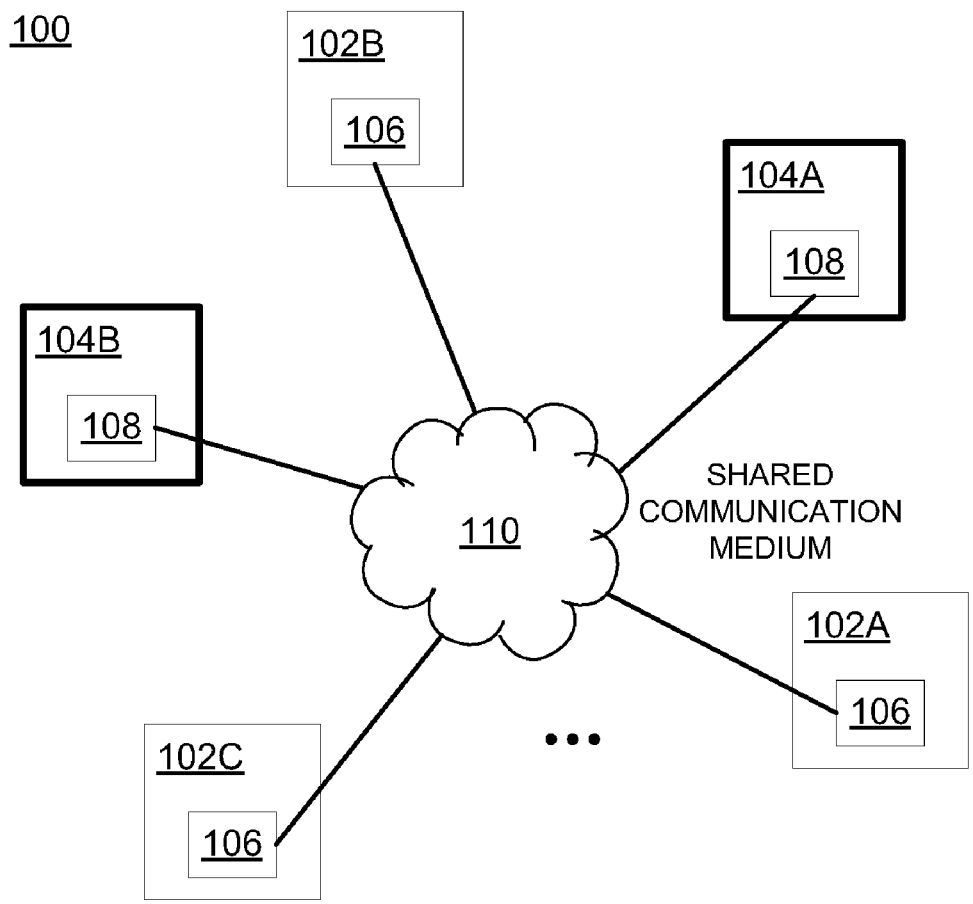
FIG. 2 is a schematic diagram of a network configuration.

As shown in FIG. 2, a network configuration 100 provides a shared communication medium 110 for a number of communication stations (e.g., computing devices, or audiovisual devices) to communicate with each other. The communication medium 110 can include one or more types of physical communication media such as coaxial cable, unshielded twisted pair, or power lines, for example. The network configuration 100 can also includes devices such as bridges or repeaters. The communication stations communicate with each other using predetermined physical (PHY) layer and medium access control (MAC) layer communication protocols. The MAC layer is a sub-layer of the data link layer and provides an interface to the PHY layer, according to the Open Systems Interconnection (OSI) network architecture standard. The network configuration 100 can have any of a variety of network topologies (e.g., bus, tree, star, mesh). The communication stations communicate with one another based on requests from software applications running on the hardware of the respective station.

The stations can have differences in the specific communication protocols used, and are still able to communicate with each other if the protocols are compatible. For example, network configuration 100 includes a first type of communication station including stations 102A, 102B, 102C that use a first MAC layer protocol "MAC-A" with a second type of communication station including stations 104A and 104B that use a second type of MAC layer protocol "MAC-B." The MAC-A and MAC-B protocols are compatible with each other and also use the same or at least compatible PHY layer protocols (e.g., one station uses a MAC-A protocol and a PHY-A protocol, and another station uses a MAC-B protocol and a PHY-B protocol, where PHY-A and PHY-B implement compatible signal modulation formats).

The co-existence of multiple MAC layer protocols can be used, for example, to allow improvements in capabilities and/or performance of the MAC layer while also allowing devices using a new MAC layer protocol to be compatible with legacy devices using an older MAC layer protocol that may exist in the network configuration 100. In some implementations, a dual-mode (DM) device can communicate with a legacy single-mode (SM) device using a first protocol, and can communicate with other DM devices using either the first protocol or a second protocol. The protocol to be used can be set by a communication mode that is determined at network setup time or when a device joins the network. For example, stations 104A and 104B include a network interface module 108 that uses MAC-A. Stations 102A, 102B, and 102C include a network interface module 106 that can use either MAC-A or MAC-B depending on the determined communication mode.

An example of a difference between the protocol layers (or "protocol stack") used by different types of devices (e.g., the DM and SM devices) is the use of a "central coordinator" (CCo) station. The CCo is a communication station that is selected to provide certain coordination functions for at least some of the other stations in the network configuration 100. A set of stations operating under the coordination of a single CCo is called a Basic Service Set (BSS). Functions performed by the CCo include: authentication of stations upon joining the BSS, provisioning of identifiers for stations, and scheduling and timing of medium access. For example, the CCo broadcasts a repeated beacon transmission from which the stations in the BSS can determine scheduling and timing information. This beacon transmission includes fields that carry information used by the stations to coordinate communication. Though the format of each of the repeated beacon transmission is similar, the content typically changes in each transmission. The beacon transmission is repeated approximately periodically, and, in some implementations, is synchronized to a characteristic of the communication medium 110. In some cases, a Proxy Coordinator (PCo) can be used to manage stations that are "hidden" from the CCo (e.g., stations that do not reliably receive signals from the CCo).

There may also be differences in the access techniques implemented by the MAC-A and MAC-B protocols. For example, in one scenario, the MAC-A protocol uses a first access technique the MAC-B protocol is compatible with the first access technique and provides a second access technique. The MAC-A protocol uses a carrier sense multiple access with collision avoidance (CSMA/CA) technique to access the network configuration 100. The MAC-B protocol uses a hybrid approach that includes a contention-free period (CFP) in which a time division multiple access (TDMA) technique is used, and optionally includes a contention period (CP) in which a CSMA/CA technique is used. The contention-free period is scheduled and managed by the CCo to provide improved quality of service (QoS) for certain applications run on a device (e.g., audio and/or video applications). Other MAC protocols can use any one or combination of these or other access techniques.

In some implementations, the network interface modules use protocols that include features to improve performance when the network configuration 100 includes a communication medium 110 that exhibits varying transmission characteristics. For example, when the communication medium 110 includes AC power lines in a house, optionally coupled to other media (e.g., coaxial cable lines), the communication channel between any two stations provided by the communication medium 110 may exhibit periodic variation in noise characteristics and frequency response.

To improve performance and QoS stability in the presence of varying channel characteristics, such as power line noise, the CCo synchronizes the beacon transmissions with the frequency of the AC line (e.g., 50 or 60 Hz). There are typically variations in the phase and frequency of the AC line cycle from the power generating plant and local noise and load changes. This synchronization enables the time slots assigned to the various stations relative to a time reference in the beacon transmission to use consistent channel adaptation optimized for a particular phase region of the AC line cycle. The CCo also provides information in the beacon transmissions including a time stamp that can be used by the stations to synchronize local clocks with respect to a master network clock located at the CCo.

Another aspect of mitigating potential impairments caused by the varying channel characteristics involves using a robust signal modulation format such as orthogonal frequency division multiplexing (OFDM), also known as Discrete Multi Tone (DMT). OFDM is a spread spectrum signal modulation technique in which the available bandwidth is subdivided into a number of narrowband, low data rate channels or "carriers." To obtain high spectral efficiency, the spectra of the carriers are overlapping and orthogonal to each other. Data are transmitted in the form of symbols that have a predetermined duration and encompass some number of carriers. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM).

PHY Layer Communication System Architecture

Any of a variety of communication system architectures can be used to implement the portion of the network interface module that converts data to and from a signal waveform that is transmitted over the communication medium. An application running on a station provides and receives data to and from the network interface module in segments. A "MAC Protocol Data Unit" (MPDU) is a segment of information including overhead and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line.

In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f = 1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

There can be two types of PPDU structures, depending on whether the PHY-A or PHY-B protocol is being used. For example, the PHY-B signals can use denser OFDM carrier frequency spacing and correspondingly longer symbols.

Figure 3:
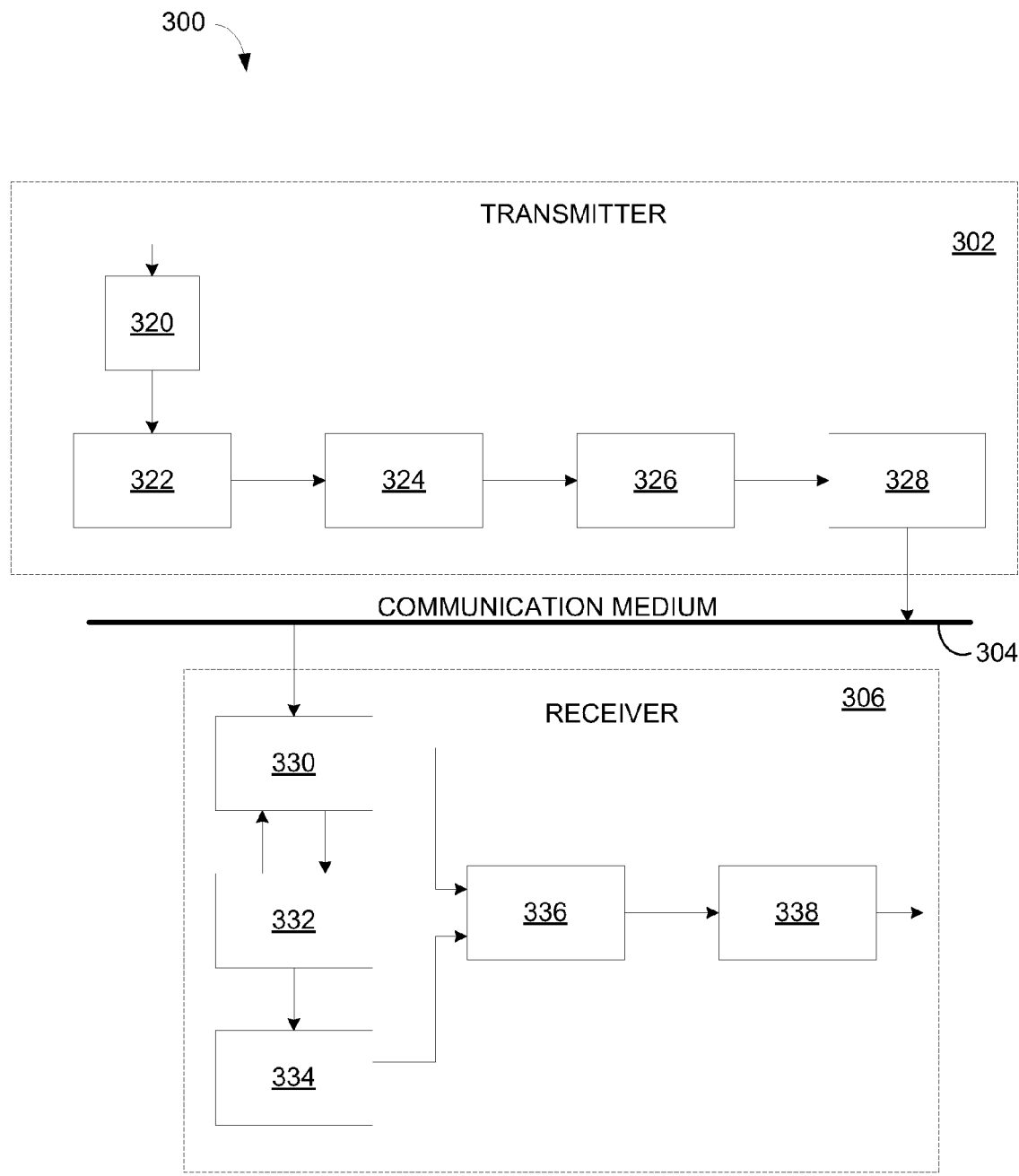
FIG. 3 is a block diagram of a communication system.

Referring to FIG. 3, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 322 also determines which of the carrier frequencies $f_1, \ldots, f_N$ within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., $A_{10} = 0$). The mapping module 322 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies $f_1, \ldots, f_N$. The modulated carriers are combined by IDFT module 324 to form a discrete time symbol waveform S(n) (for a sampling rate $f_R$), which can be written as $$S(n) = \sum_{i=1}^{N} A_i \exp[j(2\pi in/N + \Phi_i)] \qquad \text{Eq. (1)}$$

where the time index n goes from 1 to N, Ai is the amplitude and $\Phi_i$ is the phase of the carrier with peak frequency $f_i = (i/N)f_R$, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An Analog Front End (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function g(τ;t) representing an impulse response of transmission over the communication medium. The communication medium 304 may add noise n(t), which may be random noise and/or narrowband noise emitted by a jammer.

At the receiver 306, modules implementing the PHY layer receive a signal from the communication medium 304 and generate an MPDU for the MAC layer. An AFE module 330 operates in conjunction with an Automatic Gain Control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including deinterleaving and descrambling).

Any of the modules of the communication system 300 including modules in the transmitter 302 or receiver 306 can be implemented in hardware, software, or a combination of hardware and software.

Beacon Transmissions

Various stations in a network may generate regular beacon transmissions for various purposes. A repeated beacon transmission from a CCo to each of the stations in a BSS is called a Central Beacon (CB) transmission. The stations may communicate with each other in time periods between CB transmissions, provided the power line channel characteristics between any two communicating stations permits it.

One of the main functions of CB transmission is to carry medium allocation (or scheduling) information. The scheduling information allocates some of the time between CB transmissions as a contention period during which stations may contend for access to the power line medium. The scheduling information also allocates a contention-free period during which times slots are assigned to particular stations for access to the power line medium.

As described in more detail below, the CB transmission is synchronized with respect to the AC line cycle such that the time between CB transmissions (or "beacon period") is based on the underlying AC line cycle frequency. The CB transmission can be synchronized to the AC line cycle by transmitting the CB at a fixed time interval from a detectable feature of the power line waveform such as a zero crossing. The beacon period can be set to any multiple of a half of the AC line cycle period, for example, by waiting for a given number of zero crossings.

In some cases it is desirable to increase the beacon period to make more efficient use of the medium by reducing the percentage of time devoted to sending the "overhead" information in the CB transmission. There is also overhead information associated with transmissions from the stations. It may also be desirable to keep the beacon period small enough to provide a desired number transmission opportunities in a given length of time. Thus, the beacon period can be selected according to a trade-off between keeping overhead low and latency between transmission opportunities low. For example, in some implementations the beacon period is selected to be twice the AC line cycle period. In this case, when operating in power line environments with an AC line cycle frequency of 60 Hz, the beacon period would be approximately 33.33 msec. When operating in power line environments with an AC line cycle frequency of 50 Hz, the beacon period would be approximately 40 msec. Variations in the beacon period may occur due to drift in the AC line cycle frequency.

Figure 4:
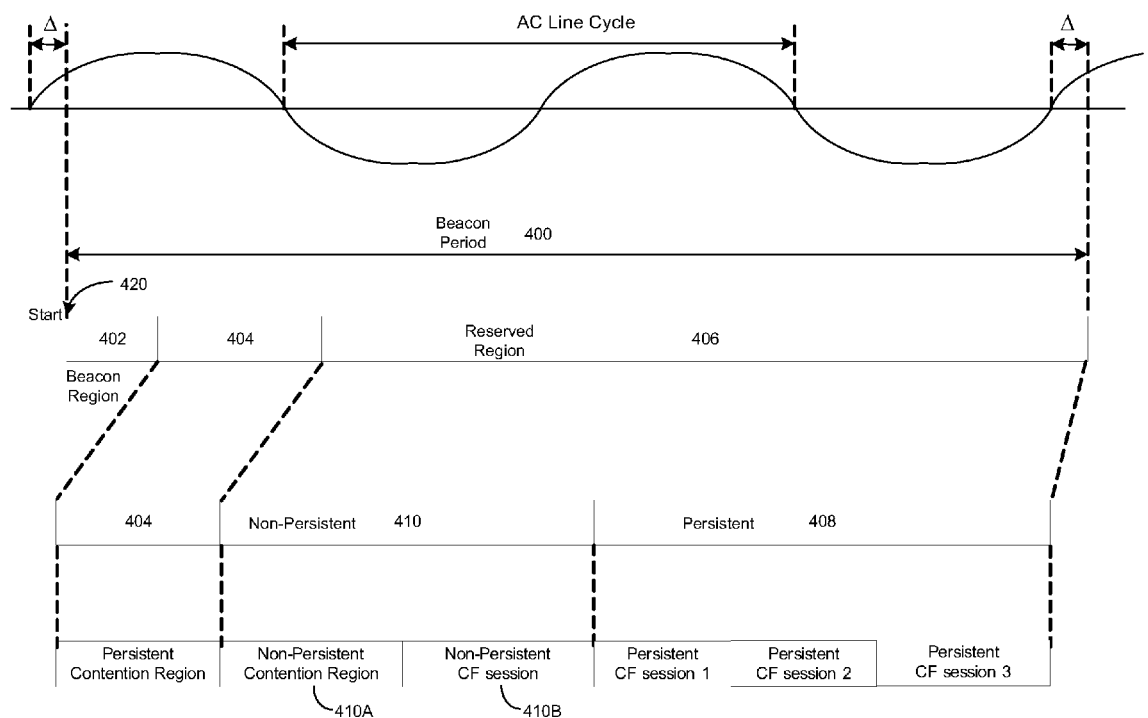
FIG. 4 is a timing diagram of a beacon period.

FIG. 4 shows the structure of an exemplary beacon period 400 which consists of a Beacon Region 402 followed by a Contention Region 404 and a Reserved Region 406. Optionally, the Beacon Region 402 can be followed by any number of Contention Regions and Reserved Regions in any order. The Contention Region 404 is a time in which stations can contend for permission to transmit using a shared medium access protocol such as CSMA/CA.

The Reserved Region 406 includes a contention-free period (CFP) 408 which includes time slots assigned for use by predetermined stations (e.g., using a TDMA protocol). The CFP 408 can be divided into contiguous time slots for each of the participating stations. Alternatively, the CFP 408 can be divided into sessions, each of which is divided into time slots for each of the participating stations. Therefore, a station may be allocated multiple times slots during the CFP 408.

The Contention Region 404 and the CFP 408 within the Reserved Region 406 are "persistent" in that they typically remain valid over multiple beacon periods. This persistent scheduled time allows stations that miss a beacon period for some reason to use previously stored schedule information, as described in more detail below. The Reserved Region 406 also includes a "non-persistent" period 410 that is not guaranteed to be valid for more than one beacon period. This non-persistent scheduled time allows rapid response to urgent time slot allocation requests, and time for network maintenance activities. For example, the non-persistent period 410 can include a time slot for a station to take a turn in transmitting a Discover Beacon used for setting up and maintaining the network. The non-persistent period 410 can use either or both of contention or contention-free access as needed. In this example, the non-persistent period 410 includes a non-persistent contention region 410A and a non-persistent contention-free "Extra Allocation" session 410B.

The Beacon Region 402 is the time allocated for the CCo to broadcast the CB transmission to the stations in the BSS. The CB transmission is sent using an OFDM waveform including preamble, frame control fields, and a beacon payload. In this example, the start 420 of the CB transmission (and thus the start of the Beacon Region 402) is synchronized to the AC line cycle at predetermined offset of Δ from the zero crossing. The beacon payload carries information used by the stations to determine the timing of the Reserved Regions and Contention Regions. In this example, one Contention Region 404 immediately follows the Beacon Region 402. If one or more Reserved Regions are present, additional Contention Regions may also be present in the beacon period 400.

Information describing the allocation of time slots within the beacon period is broadcast in the beacon payload within one or more beacon entries (BENTRYs). This information is used by stations within the network to coordinate sharing of bandwidth. The beacon payload carries three types of scheduling information:

Beacon Region information
persistent scheduling information
non-persistent scheduling information Beacon Region information is carried in a Regions BENTRY. This BENTRY contains the duration of Reserved Region 406 and the Contention Region 404. Allocations of time slots to transmitting stations for contention-free access can occur during the persistent CFP 408 in the Reserved Region 404 or during the non-persistent period 410.

Persistent CFP schedule information is carried in the Persistent Schedule BENTRY. The persistent CFP schedule is provided for use by transmitting stations requiring guaranteed QoS. It is critical that these transmitting stations obtain a sufficient amount of time during each beacon period to deliver their data and meet their loss rate and latency requirements. For example, a station is assigned a sufficient amount of time to include opportunities to retransmit lost data and still meet or exceed a minimum latency between successful transmissions. Since it is possible for a station to miss a CB transmission, this schedule is persistent.

The Persistent Schedule BENTRY has two fields that are used to interpret the persistence of schedule information:

Current Schedule Count Down (CSCD)
Preview Schedule Count Down (PSCD)

If the schedule is not changing, the schedule information reflects the current schedule and the Preview Schedule Count Down is zero. In this case, the Current Schedule Count Down indicates the minimum number of beacon periods for which the current schedule may be assumed valid. The Current Schedule Count Down value should not be smaller than the previous Current Schedule Count Down value minus one. In this way, stations that miss Beacons will know how long they may use the current schedule information they have.

When the schedule changes, the Preview Schedule Count Down is set to a non-zero value. This value indicates that the schedule information is a new schedule (not the current schedule) and when the new schedule will take effect. In this case, the Current Schedule Count Down previews the value that the new schedule will have for its Current Schedule Count Down during the first beacon period when it takes effect. The Current Schedule Count Down value in this case is a preview value and should not change from its initial value. In this way, stations that miss CB transmissions will know when they can use the new schedule information they have and for how long it will be valid. This approach allows a number of repetitions of the new schedule to ensure that all stations have the relevant information, even if some stations miss the CB transmission during the beacon period when the new schedule takes effect.

Figure 5:
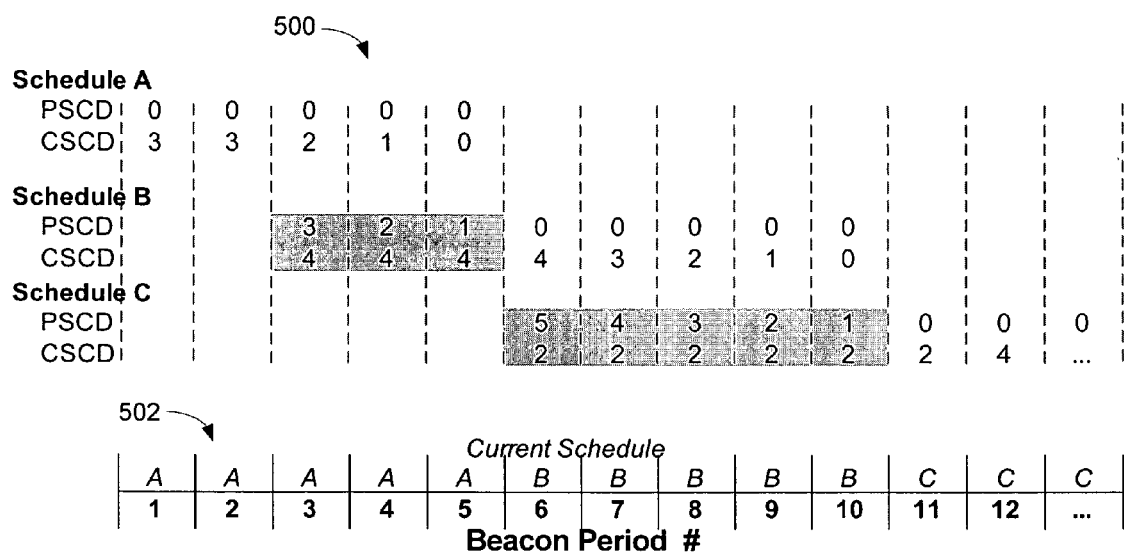
FIG. 5 is a diagram of schedules.

FIG. 5 shows examples of schedule changes. A Schedule Information chart 500 shows values for PSCD and CSCD in the BENTRY of the CB transmission sent by the CCo. A Current Schedule chart 502 shows which of two schedules, Schedule A or Schedule B, is in effect during a given beacon period. Initially, Schedule A is in effect. In Beacon Period 2, the CCo determines that the schedule should change to Schedule B. So, beginning in Beacon Period 3, the CCo includes a BENTRY containing Schedule B with the values of PSCD and CSCD shown for the schedule. (The previewed schedules are shaded in FIG. 5.) Although the CCo has the option of transmitting both Schedule A and Schedule B in separate BENTRYs, transmitting Schedule A is no longer necessary.

Once the CCo has announced Schedule B in Beacon Period 3, the earliest that Schedule B can be replaced by a new Schedule C is Beacon Period 11. That is because while the PSCD for Schedule B is non-zero, the CSCD is a preview of what the CSCD will be in the first Beacon Period that B is current (Beacon Period 6). Since the CCo chose a preview value of 4, Schedule B must be the current schedule for 5 Beacon Periods.

The CCo can update the schedule, including the size of time slots allocated to stations, in response to requests from stations or without an explicit request from a station. For example, the CCo can update the schedule based on information obtained from monitoring transmissions between stations over the shared communication medium. The CCo can adjust time slots to account for changes to channel capacity due to changes to the communication medium, or to account for changes in channel utilization.

One way the CCo is able to determine changes in various transmission characteristics is by reading information in the header fields of transmissions. For example, header fields can indicate the amount of pending data awaiting transmission, or "bit loading estimates" representing number of user data bits (e.g., excluding certain overhead data) that are being transmitted in a given amount of time (e.g., 1 microsecond). The CCo uses these fields to determine whether to increase or decrease persistent and/or non-persistent schedules.

The CCo is also able to respond to detected changes such as an increased error rate on a link between stations. For example, a station may be increasing a data rate by using a modulation with higher error rate that is more than compensated for by the increased data rate. The CCo can change the schedules to give more time to those stations that appear to need a higher data rate, or to optimize global characteristics such as total network throughput.

Persistence of schedule information improves reliability, but decreases responsiveness to urgent needs. A station that requests additional time for transmission during the CFP 408 might communicate its request to the CCo in the same Beacon Period (3) in which a new schedule (B) is announced. This calls for the transmitting station to wait for the announced schedule (B) to take effect before a revised schedule (C) can be broadcast. The revised schedule (C) must then count down before it becomes effective, so the transmitting station may be forced to wait several Beacon Periods before it can obtain the additional CFP time slot allocation it needs.

The Non-Persistent Schedule information indicates which stations are allocated a time slot during the Extra Allocation session 410B to satisfy urgent requests for more transmission time. A transmitting station must receive the CB transmission to utilize any Extra Allocation time slot it is given in a beacon period, which makes Extra Allocation time slots less reliable than the persistent CFP 408 time slots.

A transmitting station with a regular CFP 408 time slot allocation is allowed to start its transmission at its start time, as defined by the schedule, and should end its transmission by its end time, as defined by the schedule. If a transmitting station does not receive the CB transmission, but the transmitting station has the current effective schedule information (due to schedule persistence), it may start its transmission during its allocated time slot.

The CFP 408 time slot assigned to a transmitting station includes time after transmission of an MPDU during which the receiving station (or stations) can send a selective acknowledgement (SACK) according to a Selective Repeat Automatic Retransmission Request (SR-ARQ) approach. Each PPDU waveform representing an MPDU includes a preamble, frame control fields, and a payload made up of multiple segments or PHY blocks (PBs) that are encrypted independently. The preamble and frame control fields together are called the start-of-frame (SOF) delimiter. Each PB is contained in its own FEC Block. An MPDU may contain variable number of FEC blocks, depending on the data rate and payload duration. A SACK can be transmitted in response to a single MPDU, or a burst of multiple MPDUs (e.g., four) can be sent with a single SACK in response.

For example, within a time slot allocated to a transmitting station, the station may send multiple PPDUs each spanning an interval designated by the receiving station for a given channel adaptation. Each PPDU includes a SOF delimiter that can be used by the receiver to estimate phase and amplitude distortion within that adaptation interval for coherent demodulation. While a single long PPDU within a time slot may have lower overhead, transmitting multiple PPDUs enables each PPDU to use a different adaptation and provides a more accurate estimate of phase and amplitude distortion, which is likely to change in each adaptation interval. However, a single SACK can be used to acknowledge all of the MPDUs within the time slot.

The SACK format provides support for four SACK Type (SACKT) fields (one per MPDU in a burst of four MPDUs). The SACKT indicates whether:

All the PBs in the corresponding MPDU were received correctly (SACKT=0b00),

All the PBs in the corresponding MPDU were received with errors or the corresponding MPDU is not detected (SACKT=0b01), or A mixture of good and bad PBs were found in the corresponding MPDU (SACKT=0b11). In this case SACK information field (SACKI) is present. This field contains a bit map indicating the reception status of each PB within the MPDU.

Line-Cycle Synchronization

As described above, various techniques can be used to take into account varying channel characteristics of a shared communications medium. For stations communicating using a communication protocol without a CCo, such as the MAC-A protocol, different channel adaptation can be assigned to each of multiple phase regions of a periodically varying channel by a channel adaptation facility in a station that interacts with the channel adaptation facility at other stations, as described in U.S. patent application Ser. No. 10/787,544, entitled "Channel Adaptation Synchronized to Periodically Varying Channel," filed Feb. 26, 2004, incorporated herein by reference. For stations communicating using a communication protocol with a CCo, such as the MAC-B protocol, channel adaptation can be based on synchronizing the beacon transmission to the periodically varying channel. The stations can then perform channel adaptation according to the received beacon transmission without the need for each station to directly detect the phase of the periodically varying channel.

Line-cycle synchronization can be achieved by having the CCo track a particular point in the AC line cycle using a Digital Phase Locked Loop (DPLL) or equivalent. Using a filter or digital lock loop at the CCo is helpful to eliminate noise events or jitter in the measurement of the AC line cycle phase. The CCo uses its local tracking history to also predict future locations of the beacon transmissions and announce this to all stations in the beacon schedule. To ensure that stations with persistent allocations can transmit even when a CB transmission is not detected, the CCo provides information about the location of future CB transmissions within the beacon payload.

One approach to AC line cycle synchronization includes detecting the occurrence of a particular feature in the AC line cycle (e.g., the rising edge after a zero crossing) at the CCo, and using this detected feature to trigger the capture of the value of a network clock located at the CCo. For example, the value of a 25 MHz, 32-bit network clock is captured each time the detector is triggered, at each Line Cycle Time ($LCT_n$, where n=0, 1, 2, . . . denotes successive line cycle waveform periods). The CCo then generates a filtered or "smoothed" version of the Line Cycle Time called the Line Cycle Time Estimate ($LCTE_n$) which provides a more stable time reference to which the CB transmissions can be synchronized. The CCo transmits the CB transmission at the Beacon Transmit Time ($BTT_n$, where n=0, 1, 2, . . . denotes successive CB transmissions) shifted by predetermined offset, the beacon offset (BO), from the $LCTE_n$.

The following algorithm can be used to calculate $LCTE_n$. Upon initialization, the CCo calculates the Line Cycle Time Estimate for n=0 and n=1 based on two captured Line Cycle Time values:

$$LCTE_0 = LCT_0$$

$$LCTE_1 = LCT_1$$

The CCo also calculates an estimate of the line cycle period $PER_n$ as:

$$PER_0 = PER_1 = LCT_1 - LCT_0$$

The CCo, then enters a tracking phase in which the line cycle period estimate and Line Cycle Time Estimate are updated for n≧2 as follows:

$$PER_n = PER_{n-1} + w_p(LCT_n - LCT_{n-1} - PER_{n-1})$$

$$LCTE_n = LCTE_{n-1} + PER_n + w_t(LCT_n - (LCTE_{n-1} + PER_n))$$

Both $LCTE_n$ and $PER_n$ are filtered based on weighting constants $w_p$ and $w_t$ of the form $\frac{1}{2^k}$, where k is a positive integer. Larger values of k provide better filtering of the jitter caused by local noise or phase disturbances, but can result in poorer tracking of the AC line-cycle phase. It can also be helpful to limit or clip the value of $LCT_n$ to an expected range after the value is captured so that occasional large jitter in the AC line waveform does not result in large variations CB transmission times.

In addition to filtering the $LCTE_n$ values (and resulting CB transmission times) based on past values, the CCo can predict and announce future CB transmission times to allow stations that miss a CB transmission to rely on previously received CB transmissions. For example, if there is a slow linear increase in line cycle frequency, the CCo can extrapolate future $LCTE_n$ values based on a linear fit to past values. The frame control fields of a CB transmission can include a Beacon Transmission Offset (BTO) field to announce the offset of future CB transmissions from an expected location based on the network clock at the CCo. For example, the BTO field can be a signed 16-bit value measured in units of periods of the 25 MHz clock. Each CB transmission can include multiple BTO fields to provide the offsets of the first CB transmission that follows the current CB transmission, the second CB transmission that follows the current CB transmission, and so on. The number of BTO fields that can be present in the frame control of the CB transmission is variable. A predetermined BTO value (e.g., 0×8000) can be used to indicate that the corresponding BTO field is invalid (i.e., not used). BTO fields, together with the persistent schedule, enable a station to accurately transmit in its persistent allocation time slot when a CB transmission is missed. The number of BTO fields presented in a CB transmission can be chosen such that it is greater than or equal to the maximum persistence of schedule(s) present in the beacon payload.

Figure 6:
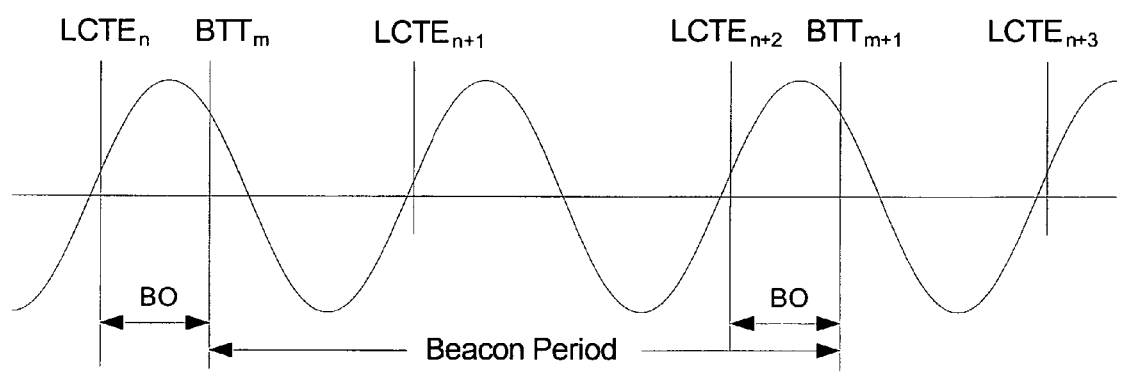
FIG. 6 is a timing diagram for a line-cycle synchronization procedure.

FIG. 6, illustrates the relationship between the Line Cycle Time and Beacon Transmit Time. The time of a CB transmission that is p beacon periods in the future $BTT_{m+p}$ and the corresponding $BTO_{m+p}$ are calculated at the CCo as follows:

$$BTT_{m+p} = LCTE_n + (qpPER_n) + BO$$

$$BTO_{m+p} = BTT_{m+p} - BTT_{m+p} - qPER_{LC}$$

where BO is the beacon offset, $PER_{LC}$ is the nominal line cycle period (e.g., 20 ms for a 50 Hz line cycle), and q is the number of line cycle periods in a beacon period (q=2 in this example).

The CCo is able to move the CB transmission (e.g., by changing the BO) to increase reliability in detection of the CB transmission. For example, a station sets a Beacon Detect Flag (BDF) in a frame control field that indicates whether the station successfully received the CB transmission in the current beacon period. The CCo can use this information to determine reliability in detection of the CB transmission by the stations in the BSS.

Clock Synchronization

The CCo includes a Network Clock that is used to provide a distributed time reference for the stations in the BSS. The CCo transmits a time stamp generated from the Network Clock in the CB transmission. For example, the time stamp can be a 32-bit value from a counter that increments with an edge (e.g., a rising edge) of the CCo's 25 MHz Network Clock. All timing of the network, including the beacon period and schedule, can be derived from the Network Clock. Each station synchronizes a local time reference (e.g., a digital phase locked loop) to the Network Clock. The start of transmission (e.g., start of the preamble) of the CB transmission occurs close (e.g., within less than a microsecond) to the time stamp value.

The Network Clock is used to synchronize the PHY layer signaling between stations to eliminate inter-carrier interference without the need for high accuracy clocks. For example, while a local clock at a station may be accurate enough to provide accurate sample times for sampling a PHY-A signal with 200 kHz carrier spacing, the local clock may cause inter-carrier interference when used for sampling a PHY-B signal having only a 25 kHz carrier spacing. The denser carrier spacing corresponds to longer symbols and more time for a frequency error between transmitting and receiving station clocks to lead to sampling errors. Other signal characteristics can also contribute to a signal's sensitivity to sampling errors. For example, higher order modulation (e.g., 16-QAM vs. 4-QAM) typically has tighter timing tolerances. The consequence of the sampling errors may be that the carriers are no longer strictly orthogonal. This sampling error may affect high-frequency carriers more than low-frequency carriers.

The PHY layer clock used to determine sampling times may be faster than the local clock that is synchronized to the Network Clock based on the time stamps. In some implementations the PHY layer clock is 75 MHz, and is adjusted based on the local 25 MHz clock. For example, if the local clock tracking the Network Clock is adjusted by 10 parts per million (ppm) (relative to 25 MHz), then the PHY layer clock is also adjusted by 10 ppm (relative to 75 MHz).

Channel Estimation

Channel estimation is the process of measuring the characteristics of the power line channel to adapt the operation of the PHY layer to provide optimal performance.

Channel estimation can include:
Selection of the Tone Map designating modulation method(s) to be used on each carrier. Any given carrier may use different modulations at different times within the beacon period.
Selection of the FEC rate.
Selection of the guard interval length.
Selection of the intervals within the beacon period where a particular Tone Map, FEC rate, and guard interval setting applies.

The FEC rate and guard interval length can vary over the AC line cycle period, but they are the same for all carriers at any given time.

The results of channel estimation are reported to the CCo for use in allocating time slots in the CFP. The CCo can allocate time for communication between a transmitting and receiving station to perform channel estimation. The CCo can then use this channel estimation information in determining or updating the schedule of time slots allocated to stations in the CFP.

The channel-estimation procedures may differ slightly between the CP and the CFP. In the CP, the receiving station can designate a default Tone Map that may be used by the transmitting station anywhere in the CP. The receiving station may optionally define additional Tone Maps that may be used in the CP during particular intervals of the beacon period. This approach allows the transmitting station to begin communicating using Tone Map modulated data quickly, and avoids complicated interactions between the CSMA access procedure and the channel-estimation procedures for the CP. This approach is well suited to the transport of best effort data. Alternatively, the receiving station can designate intervals within a beacon period over which particular channel adaptation applies without taking into account whether a transmission is within the CP or the CFP.

Before data communication occurs in the CFP, the receiving station defines a Tone Map that is valid in the interval of the beacon period where the transmission is scheduled. If no valid Tone Map is defined in an interval, the transmitting station sends a "SOUND MPDU" in the interval until the receiving station defines a Tone Map that for the interval. The SOUND MPDU includes a signal known to the receiving station from which the receiving station can estimate characteristics of the channel. The receiving station defines a tone map in which the modulation for a carrier is tailored to he characteristics of the channel at that carrier frequency. In addition to channel characteristics, the receiving station can also define a tone map based on a type of data to be transmitted (e.g., more robust modulation for applications more sensitive to data loss). The Tone Map is sent to the transmitting station in a channel estimation response (CER) message.

Alternatively, if no valid Tone Map is defined in an interval, the transmitting station can use a default Tone Map that has enough redundancy to be successfully transmitted assuming worst case channel characteristics. This default Tone Map may be more appropriate if the transmitting station only has a relatively small amount of data to send. The channel-estimation procedures also include mechanisms for maintaining the lists of the intervals within the beacon period where each Tone Map may be used. Tone Map intervals are defined as time periods within the beacon period where a particular Tone Map may be used. Since the CCo locks the beacon period to the AC line cycle, intervals are synchronized to the AC line cycle.

Figure 1:
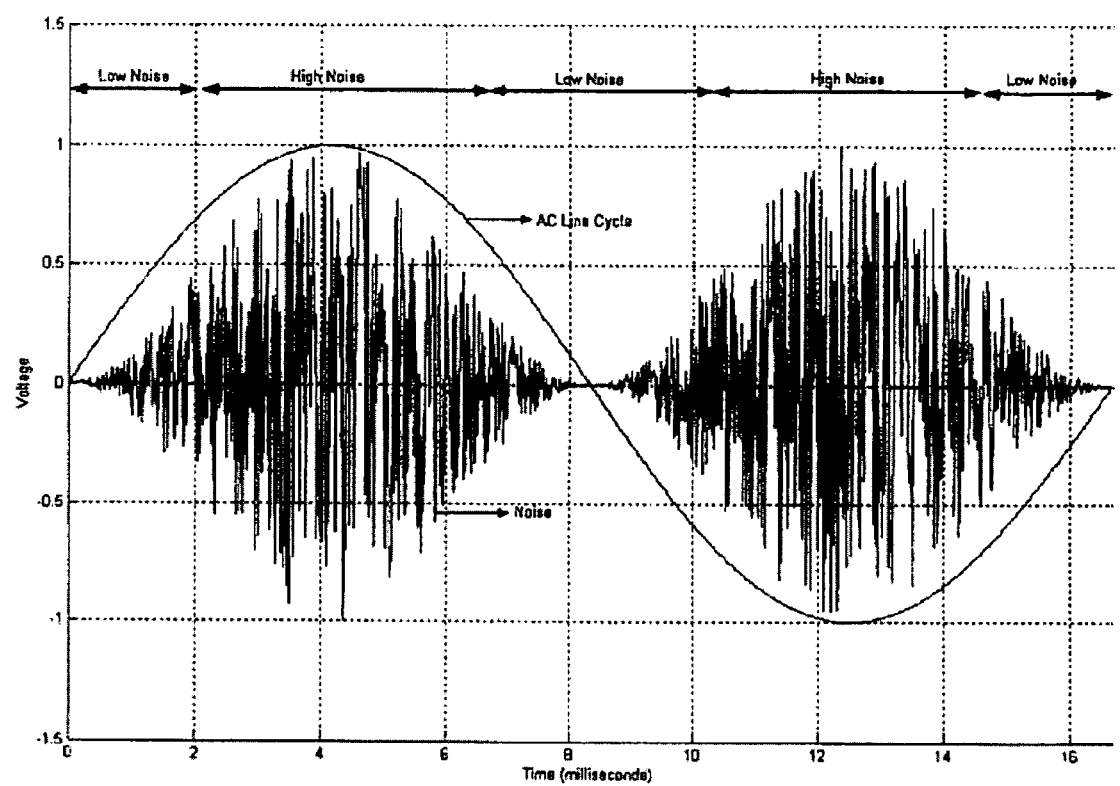
FIG. 1 shows an example of the variation in noise with AC line cycle waveform period.

Channel and noise characteristics over the power line tend to be periodic with the underlying AC line cycle. In some cases, these impairments occur at twice the frequency of the AC line cycle (i.e., 100 or 120 Hz) as shown in FIG. 1, while in other cases they may occur at the same frequency as the AC line cycle (e.g., a noise source that responds to the polarity of the AC line waveform). Because of the different access mechanisms and QoS requirements, intervals occurring in the CP and CFP may be treated differently.

The receiving station specifies the intervals within which various Tone Maps may be used, subject to certain guidelines which may include any of the following:

- The CP default Tone Map may be used anywhere in the contention period.
- With the exception of default Tone Map, intervals are disjoint (non-overlapping).
- The transmitter may not transmit PPDUs with the PPDU Payload crossing the boundary between intervals using different Tone Maps.
- The receiver specifies intervals that are large enough to carry a complete PPDU, based on the indicated Tone Map.
- The current intervals definition is carried in the CER message.
- The current intervals definition becomes stale if a period of 30 seconds has elapsed since the last CER message was received from the receiving station.

Many other implementations of the invention other than those described above are within the invention, which is defined by the following claims.

What is claimed is:

1. A method for operating in a network in which stations communicate over a shared medium, the shared medium having at least one varying channel characteristic that varies approximately periodically such that a period associated with the varying channel characteristic is approximately equal to a predetermined value, the method comprising:

providing repeated beacon transmissions from a coordinator station for coordinating transmissions among a plurality of the stations, wherein at least some beacon transmissions are synchronized to the varying channel characteristic;

determining a start time of a beacon transmission based on a time offset from a detected feature of the varying channel characteristic;

including in the beacon transmission information indicating start times of a plurality of future beacon transmissions;

including in the beacon transmission information indicating time slots relative to the future beacon transmissions during which a first station is permitted to transmit to at least one receiving station; and transmitting from the first station to at least one receiving station during a time slot determined based on at least one of the beacon transmissions received by the first station from the coordinator station.

2. The method of claim 1, wherein the coordinating station assigns time slots to at least some stations designated by information in the beacon transmissions.

3. The method of claim 2, wherein at least some stations synchronize adaptation to transmission time slots designated by the coordinator station to enable the stations to assign different adaptation according to different phase regions of the periodically varying channel characteristic.

4. The method of claim 2, wherein at least some transmissions over the shared medium comprise quality of service (QoS) sensitive transmissions, and the coordinator station assigns time slots for at least some of the QoS sensitive transmissions that correspond to phase regions of the periodically varying channel characteristic in which transmission impairments are less than in other phase regions.

5. The method of claim 1, wherein the network comprises a power line communication network and the shared medium comprises an alternating current (AC) power line.

6. The method of claim 5, wherein the varying channel characteristic comprises noise that varies according to an AC power line waveform.

7. The method of claim 5, wherein the varying channel characteristic comprises a frequency response that varies according to an AC power line waveform.

8. The method of claim 1, further comprising synchronizing at least some beacon transmissions to an alternating current power line waveform at the coordinator station.

9. The method of claim 8, wherein synchronizing at least some beacon transmissions to the alternating current power line waveform comprises detecting a zero crossing of the alternating current power line waveform.

10. The method of claim 8, wherein synchronizing at least some beacon transmissions to the alternating current power line waveform comprises setting a time between successive beacon transmissions to an integral multiple of half periods of the alternating current power line waveform.

11. The method of claim 10, further comprising selecting the integral multiple to be at least as large as a value for which the time duration of the beacon transmission is less than half of the time between successive beacon transmissions.

12. The method of claim 11, wherein the integral multiple is four, so that the time between successive beacon transmissions is two periods of the alternating current power line waveform.

13. The method of claim 1, further comprising transmitting from the first station to a receiving station during a time slot determined from a time reference contained in the beacon transmission received by the first station.

14. The method of claim 13, wherein the time reference comprises a time at which a predetermined portion of the beacon transmission is received by the first station.

15. The method of claim 13, wherein determining the time slot from the time reference comprises determining starting and ending times for the time slot measured from the time reference, based on information in the beacon transmission.

16. The method of claim 13, wherein the time slot is assigned to the first station for transmitting to at least one receiving station.

17. The method of claim 16, wherein the first station is assigned a plurality of non-contiguous time slots between successive beacon transmissions for transmitting to at least one receiving station.

18. The method of claim 17, wherein the plurality of time slots are arranged such that the longest time between any two time slots assigned to the first station is at least as small as a value that satisfies a latency constraint of an application transmitting from the first station.

19. The method of claim 18, wherein the plurality of time slots include opportunities to retransmit data to account for a data loss rate.

20. The method of claim 13, wherein the time slot is available for the first station after a successful contention process.

21. The method of claim 20, wherein the coordinating station assigns time slots to at least some stations designated by information in the beacon transmissions, and assigns a region of time over which any of a plurality of stations can transmit after a successful contention process.

22. The method of claim 13, wherein transmitting from the first station to the receiving station comprises preparing a signal to be transmitted during the time slot based on adaptation information from the receiving station.

23. The method of claim 22, wherein the adaptation information comprises a map that designates a type of modulation that is to be used, respectively, on each of multiple carriers in the signal.

24. The method of claim 23, wherein the adaptation information comprises a plurality of maps, each map designating a type of modulation that is to be used, respectively, on each of multiple carriers in the signal, each map corresponding to a selected interval of time between beacon transmissions.

25. The method of claim 24, wherein the time slot overlaps with a plurality of the selected time intervals.

26. The method of claim 22, wherein the adaptation information comprises a forward error correction rate that is to be used for encoding the signal.

27. The method of claim 22, wherein the adaptation information comprises a guard interval length that is to be used between symbols forming the signal.

28. The method of claim 22, wherein the adaptation information is determined by the receiving station based on at least one prior transmission from the first station.

29. The method of claim 28, wherein the adaptation information is determined by the receiving station based on at least one prior transmission from the first station during a previous time slot that corresponds to the time slot.

30. The method of claim 28, wherein the adaptation information is determined by the receiving station based on characterizing effects of the shared medium on a prior transmission from the first station.

31. The method of claim 30, wherein the prior transmission includes data known to the receiving station.

32. The method of claim 30, wherein the effects include at least one of signal-to-noise ratio, attenuation, and bit error rate.

33. The method of claim 30, further comprising transmitting information based on the effects to the coordinator station for use in assigning time slots to stations.

34. The method of claim 33, wherein the information based on the effects comprises a predicted maximum data rate that can be reliably achieved within a specified time slot.

35. The method of claim 33, wherein the prior transmission occurs during a temporary time slot assigned by the coordinator station before the coordinator station assigns more persistent time slots to stations.

36. The method of claim 34, wherein the coordinator station uses predicted maximum data rates from a plurality of stations to increase the total capacity of the network.

37. The method of claim 22, wherein the adaptation information is determined based on communication characteristics of an application transmitting between the first station and the receiving station.

38. The method of claim 37, wherein the communication characteristics comprise sensitivity of the application to data loss.

39. The method of claim 37, wherein the communication characteristics comprise quality of service requirements of the application.

40. The method of claim 22, wherein the adaptation information is determined by the receiving station in response to a request from the first station.

41. The method of claim 22, further comprising transmitting the adaptation information to the coordinator station.

42. The method of claim 41, wherein the adaptation information is transmitted to the coordinator station from the first station.

43. The method of claim 41, wherein the adaptation information is transmitted to the coordinator station from the receiving station.

44. The method of claim 41, wherein the adaptation information is transmitted to the coordinator station in a message for the coordinator station.

45. The method of claim 41, wherein the adaptation information is transmitted to the coordinator station in a header of a message broadcast over the shared medium.

46. The method of claim 41, wherein the coordinator station determines time slots assigned to stations based on the adaptation information.

47. The method of claim 1, further comprising transmitting a signal from the first station to a plurality of receiving stations during the time slot, including preparing the signal based on adaptation information from at least some of the plurality of receiving station.

48. The method of claim 47, wherein preparing the signal based on the adaptation information comprises preparing the signal using the lowest modulation bits per symbol received from any of the plurality of receiving stations.

49. The method of claim 47, wherein preparing the signal based on the adaptation information comprises preparing the signal using the lowest forward error correction rate received from any of the plurality of receiving stations.

50. The method of claim 1, wherein transmitting from a first station to at least one receiving station during a time slot determined based on at least one of the beacon transmissions received by the first station from the coordinator station comprises, after failing to successfully receive a recent beacon transmission, transmitting from the first station to a receiving station during a time slot determined based on information contained in a beacon transmission prior to the recent beacon transmission.

51. The method of claim 1, further comprising selecting the time offset based on reliability of successful reception of beacon transmissions by stations in the network.

52. The method of claim 1, further comprising including in the beacon transmission information indicating a start time of a future beacon transmission.

53. The method of claim 52, wherein the information is based on start times of a plurality of past beacon transmissions.

54. A system in which stations communicate over a shared medium, the shared medium having at least one varying channel characteristic that varies approximately periodically such that a period associated with the varying channel characteristic is approximately equal to a predetermined value, the system comprising:

a coordinator station configured to provide repeated beacon transmissions for coordinating transmissions among a plurality of the stations, wherein at least some beacon transmissions are synchronized to the varying channel characteristic, determine a start time of a beacon transmission based on a time offset from a detected feature of the varying channel characteristic, include in the beacon transmission information indicating start times of a plurality of future beacon transmissions, and include in the beacon transmission information indicating time slots relative to the future beacon transmissions during which a first station is permitted to transmit to at least one receiving station; and the first station configured to transmit to at least one receiving station during a time slot determined based on at least one of the beacon transmissions received by the first station from the coordinator station.

55. A method for operating in a network in which stations communicate over a shared medium, the shared medium having at least one varying channel characteristic that varies approximately periodically such that a period associated with the varying channel characteristic is approximately equal to a predetermined value, the method comprising:

providing repeated beacon transmissions from a coordinator station for coordinating transmissions among a plurality of the stations, wherein at least some beacon transmissions are synchronized to the varying channel characteristic;

transmitting from a first station to at least one receiving station during a time slot determined from a time reference contained in at least one of the beacon transmissions received by the first station from the coordinator station, wherein transmitting from the first station to the receiving station comprises preparing a signal to be transmitted during the time slot based on adaptation information from the receiving station; and transmitting updated adaptation information from the receiving station to the first station in response to a change in a metric characterizing effects of the shared medium on a prior transmission from the first station.

56. The method of claim 55, wherein the coordinating station assigns time slots to at least some stations designated by information in the beacon transmissions.

57. The method of claim 56, wherein at least some stations synchronize adaptation to transmission time slots designated by the coordinator station to enable the stations to assign different adaptation according to different phase regions of the periodically varying channel characteristic.

58. The method of claim 56, wherein at least some transmissions over the shared medium comprise quality of service (QoS) sensitive transmissions, and the coordinator station assigns time slots for at least some of the QoS sensitive transmissions that correspond to phase regions of the periodically varying channel characteristic in which transmission impairments are less than in other phase regions.

59. The method of claim 55, wherein the network comprises a power line communication network and the shared medium comprises an alternating current (AC) power line.

60. The method of claim 59, wherein the varying channel characteristic comprises noise that varies according to an AC power line waveform.

61. The method of claim 59, wherein the varying channel characteristic comprises a frequency response that varies according to an AC power line waveform.

62. A system in which stations communicate over a shared medium, the shared medium having at least one varying channel characteristic that varies approximately periodically such that a period associated with the varying channel characteristic is approximately equal to a predetermined value, the system comprising:

a coordinator station configured to provide repeated beacon transmissions for coordinating transmissions among a plurality of the stations, wherein at least some beacon transmissions are synchronized to the varying channel characteristic; and a first station configured to transmit to at least one receiving station during a time slot determined from a time reference contained in at least one of the beacon transmissions received by the first station from the coordinator station, wherein transmitting from the first station to the receiving station comprises preparing a signal to be transmitted during the time slot based on adaptation information from the receiving station; and the receiving station configured to transmit updated adaptation information to the first station in response to a change in a metric characterizing effects of the shared medium on a prior transmission from the first station.

* * * * *